US00RE34005E

United States Patent [19]

Levinson et al.

[11] E Patent Number: Re. 34,005

[45] Reissued Date of Patent: Jul. 21, 1992

[54] CONTACT FOR TERMINATING AN OPTICAL FIBER

[75] Inventors: Frank H. Levinson, Menlo Park; Pravin Soni, Union City, both of Calif.; Adam C. Tanous, Charlottesville, Va.; Richard J. McCrae, Hatfield, Pa.; Mark Ostasiuk, Newark, Calif.

[73] Assignee: Raychem Corporation, Menlo Park, Calif.

[21] Appl. No.: 569,114

[22] Filed: Aug. 17, 1990

Related U.S. Patent Documents

Reissue of:

[64] Patent No.: 4,790,622
Issued: Dec. 13, 1988
Appl. No.: 799,898
Filed: Nov. 20, 1985

[51] Int. Cl.[5] ..... G02B 6/36

[52] U.S. Cl. ..... 385/80; 385/86

[58] Field of Search ..... 350/96.2, 96.21, 96.22, 350/320; 385/76, 77, 78, 79, 80, 86, 87

[56] References Cited

U.S. PATENT DOCUMENTS

| | | | |
|---|---|---|---|
| 3,631,150 | 12/1971 | Green | 528/123 |
| 4,023,886 | 5/1977 | Nakayama et al. | 350/96.2 X |
| 4,208,093 | 6/1980 | Borsuk | 350/96.2 |
| 4,221,461 | 9/1980 | Bair | 350/96.2 |
| 4,362,356 | 12/1982 | Williams et al. | 350/96.2 |
| 4,436,366 | 3/1984 | Abramson | 350/96.2 |
| 4,447,121 | 5/1984 | Cooper et al. | 350/96.2 |
| 4,448,483 | 5/1984 | Ryley, Jr. | 350/96.21 |
| 4,512,630 | 4/1985 | Runge | 350/96.21 |
| 4,516,829 | 5/1985 | Borsuk et al. | 350/96.2 |
| 4,614,401 | 9/1986 | Strait, Jr. | 350/96.21 |
| 4,614,402 | 9/1986 | Caron et al. | 350/96.21 |
| 4,626,067 | 12/1986 | Watson | 350/96.2 |
| 4,643,520 | 2/1987 | Margolin | 350/96.2 |
| 4,681,398 | 7/1987 | Bailey et al. | 350/96.2 |

FOREIGN PATENT DOCUMENTS

| | | | |
|---|---|---|---|
| 0086266 | 8/1983 | European Pat. Off. . | |
| 57-56809 | 4/1982 | Japan . | |
| 2007869 | 5/1979 | United Kingdom . | |
| 1567636 | 5/1980 | United Kingdom . | |
| 2052790 | 1/1981 | United Kingdom . | |
| 2068142 | 8/1981 | United Kingdom . | |
| 2111240 | 6/1983 | United Kingdom | 350/96.2 |

OTHER PUBLICATIONS

Bauman et al, "Fiber-Optic Cable Termination Method," IBM Tech. Discl. Bull., vol. 24, No. 2, Jul. 1981, p. 1150.

*Primary Examiner*—John D. Lee
*Attorney, Agent, or Firm*—Dennis E. Kovach; Herbert G. Burkard

[57] ABSTRACT

An optical fiber contact for terminating an optical fiber includes a solid multi-part thermoset mixture in a cavity in a front portion of the contact, an optical fiber being terminated by heating the thermoset so as to cause it to soften and liquify and subsequently inserting an optical fiber through the contact. The thermoset when liquified chemically reacts so as to form an epoxy adhesive which secures the optical fiber within the contact and keeps the optical fiber in place even when subjected to extremely wide temperature variations.

34 Claims, 2 Drawing Sheets

CONTACT FOR TERMINATING AN OPTICAL FIBER

Matter enclosed in heavy brackets [ ] appears in the original patent but forms no part of this reissue specification; matter printed in italics indicates the additions made by reissue.

BACKGROUND OF THE INVENTION

The present invention relates to an optical fiber contact for terminating an optical fiber and methods of terminating optical fibers.

Numerous methods have been proposed in the prior art for terminating optical fibers to fiber contacts and interconnecting such contacts. In severe environments where a relatively wide temperature range can be expected, such as in aerospace, geophysical, industrial, and marine applications, it has been common to mix two liquids together in the field to form a liquid epoxy which is then used to terminate an optical fiber to a fiber contact, the contact then being mechanically assembled with additional hardware to form a connector. This termination method is disadvantageous since it is messy, very craft sensitive, and time consuming. In addition, such fiber contacts tend to be intricate in design in that they include the connector hardware and therefore are unduly large which makes them hard to use since they are substantially larger in cross-section than the fiber cable.

Prior art contacts suffer from a further disadvantage in that they are oftentimes required to be formed to precise longitudinal lengths to insure that an optical fiber terminated therewith will be disposed a pre-controlled distance from an optical source when connected thereto. A further disadvantage of prior art optical fiber contacts is that oftentimes the user is required to cleave an end of the optical fiber at a position flush with an end of the contact, and then subsequently polish the cleaved optical fiber end, which operations are very craft sensitive and time consuming. Finally, prior art contacts have relatively short shelf lives.

SUMMARY OF THE INVENTION

Accordingly, it is an object of the invention to eliminate the above-noted drawbacks of prior art optical fiber contacts and termination methods, and to provide an optical fiber contact which is relatively simple in design, small in size, and easy to install.

These and other objects are achieved by a contact which includes a contact body having a cavity therein and an aperture therethrough through which an optical fiber to be terminated can extend, and a solid thermoset adhesive disposed within the cavity through which the optical fiber can be inserted, the thermoset comprising a multi-component mixture which when heated softens, liquifies, mixes and chemically reacts so as to cure to form an adhesive, capable of adhering to the optical fiber and to the contact body, one example of the thermoset being a multipart epoxy. Such a thermoset makes termination of an optical fiber easy, and being in a solid multipart unreacted form, the thermoset is inherently stable and has a relatively long shelf life. A preferred curing mechanism is chemical crosslinking.

According to one preferred embodiment of the invention, the thermoset completely fills the cavity, and the optical fiber is terminated by first heating the contact body so as to liquify the thermoset, and thereafter an end of the optical fiber is inserted through the liquified thermoset. Preferably the thermoset is formulated so as to be optically transparent and so as to have an index of refraction substantially the same as that of a core of the optical fiber, and accordingly a portion of the thermoset which adheres to an end of the optical fiber and cures thereon thus forms a relatively hard resiliently deformable index matching material on the end of the terminated optical fiber which can then be pressed against a similar index matching material disposed on a similarly terminated optical fiber to eliminate an air gap therebetween.

Accordingly to another preferred embodiment, the thermoset is shaped so as to form a cylinder having a bore therein through which the optical fiber being terminated is inserted, and with this embodiment it is advantageous to dispose an index matching material on an end of the optical fiber being terminated subsequent to inserting it through the contact body.

A further feature of the invention is that of forming a reservoir adjacent the front end of the contact body aperture which allows the relatively hard resiliently deformable index matching material disposed on the terminated end of the optical fiber to flatten out when it is pressed against other similarly terminated optical fiber so as to eliminate any air gap therebetween and associated optical losses.

According to a further feature of the invention, the contact body comprises a ring and first and second tubes, the ring preferably being press fitted onto the second tube adjacent a flange thereof, the first and second tubes being telescopically press fitted together such that a back end of the first tube is separated from a front end of the ring so as to form a gap therebetween, a length of the gap being controlled so as to precisely control a distance l between a front end of the first tube and the front end of the ring, this assembly procedure eliminating any need for precisely machining and controlling a longitudinal length of the first tube and yet allows a means for accurately positioning an end of the terminated optical fiber relative to a reference point, e.g. the front of the ring, which enables the terminated optical fiber end to be positioned at an optimum focusing point.

Preferably, the contact further includes a plurality of flanges at a back end of the contact body which extend from an outer circumferential surface of the contact body, the flanges forming at least one annular reservoir on the surface of the contact body between the flanges, the contact further including a second solid adhesive disposed in the reservoir and secured to the contact body, the adhesive being capable of tightly adhering to braids of an optical fiber cable when the braids are forced into the second adhesive preferably by hoop stresses generated by a sleeve disposed around the braids when recovered using heat.

The invention further includes improved methods of terminating an optical fiber, one method being first cleaving the optical fiber and then inserting the cleaved optical fiber end through the contact body so as to be precisely positioned flush with a front end of the contact body. According to an alternative preferred termination method, the optical fiber is first inserted through the contact body so as to extend a substantial distance in front of the front face of the contact body and cleaved thereat, and subsequently the cleaved optical fiber end is retracted so as to be flush against the front face of the contact body.

DESCRIPTION OF THE PREFERRED EMBODIMENTS

Figure 1:
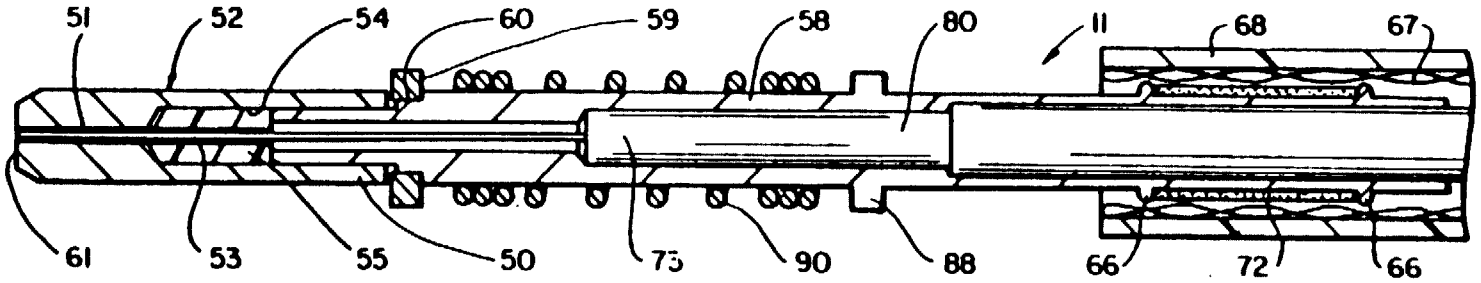
FIG. 1 is a cross-sectional view of a preferred embodiment of an optical fiber contact constructed according to the present invention.
Figure 2:
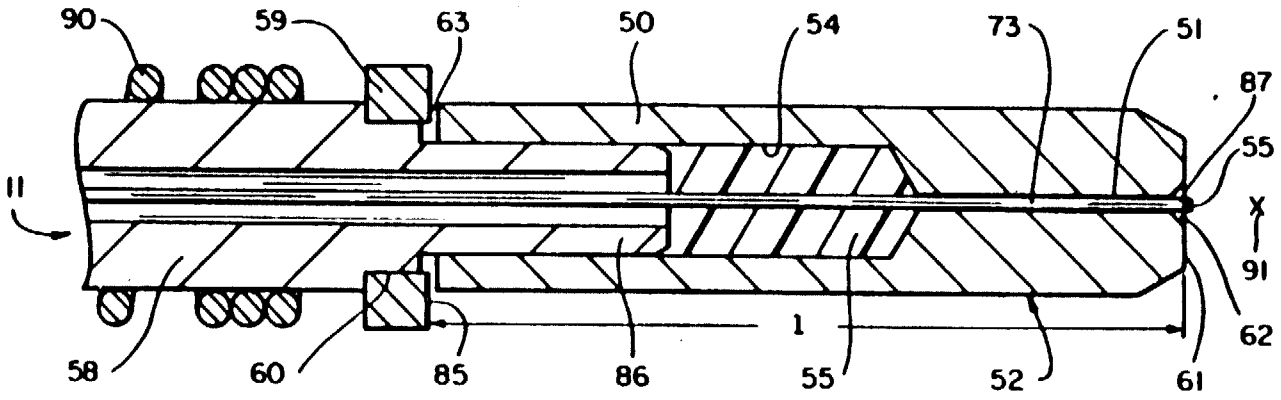
FIG. 2 is an enlarged more detailed cross-sectional view of a front portion of the optical fiber contact of the invention which lacks a preformed adhesive bore 53 shown in FIG. 1 but which is otherwise identical in construction with the contact of FIG. 1.

FIG. 1 illustrates a preferred embodiment of an optical fiber contact 11 for terminating an optical fiber 73, and FIG. 2 illustrates details of a front end 52 of the contact 11.

Referring to FIGS. 1 and 2, the optical fiber contact 11 comprises a ring 59 and first and second tubes 50, 58. Preferably, the ring 59 and a flange 60 of the second tube 58 are formed so that an outside diameter of the flange 60 and an inside diameter of the ring 59 are closely sized such that a press fit therebetween is created. Extending forward of the flange 60 is a reduced diameter section 86 which has an outside diameter which closely corresponds to an inside diameter of the first tube 50 such that the first and second tubes 50, 58 telescopically mate in a press fitting manner.

In many applications, it is advantageous if a distance 1 (FIG. 2) between a fixed reference point, in this case a front face 85 of the ring 59, and a front face 61 of the contact is precisely controlled so that an end 87 of the optical fiber, which is flush with the front face 61 of the contact 11, can be precisely axially positioned relative to a light source so as to be optimally situated with respect thereto so as to receive an optimum amount of light from the light source. To this end, prior art contacts have generally been precisely machined so as to precisely control a longitudinal length thereof relative to a fixed reference point such as a ring or seating flange so that the front end 87 of the optical fiber 73 could be precisely positioned longitudinally relative to another element such as a light source.

However, with the invention, since the first and second tubes 50, 58 are press fit together in a variable manner, a longitudinal length of the first tube 50 is not required to be precisely controlled since when the first and second tubes 50, 58 are telescopically assembled, the first tube 50 is slideably engaged over the section 86 only a distance sufficient such that the distance 1 equals a predetermined value. In other words, a gap 63 between the front face 85 of the ring 59 and a back end of the tube 50 compensates for variations in length of the tube 50 such that a length of the gap 63 plus a length of the tube 50 always equals the value 1. In practice, it is a relatively expedient matter to assemble the tubes 50, 58 so to achieve the value 1 between the front face 61 and the front face 85, whereas it is much more difficult to precisely fabricate elements so as to have a precise longitudinal length as is done with prior art contacts.

FIG. 2 further illustrates a cavity 54 within the first tube 50, the cavity being formed by the assembly of parts 50, 58 and 59. A thermoset 55 is disposed within the cavity 54, the thermoset comprising a multipart solid material mixture, one example being an epoxy mixture. The thermoset 55 is disposed in the cavity 54 in a substantially unreacted form, and includes chemicals which when liquified mix and chemically react so as to form an adhesive, the chemical reaction preferably including crosslinking curing. Subsequent to curing and cooling, the mixture 55 provides a strong bond capable of adhering over a wide temperature range. Specifically, the thermoset 55 when heated softens, liquifies, mixes and cures to form an adhesive capable of adhering to the optical fiber 73 and the inside of the tube 50. The use of a solid multipart thermoset pre-installed within the tube 50 is advantageous since the user is not required to mix multiple shelf life sensitive materials in the field so as to form an adhesive for terminating an optical fiber. However, it should be noted that contact illustrated in FIGS. 1 and 2 can be used with liquid epoxies mixed in the field as well as other fiber termination techniques, the use of the pre-installed solid multipart thermoset comprising one preferred embodiment of the invention.

If a solid multipart thermoset is used, two further embodiments are to completely fill the cavity 54 with the thermoset 55 or alternatively to form the thermoset 55 so as to have a preformed bore 53 (FIG. 1) in a central regional thereof which aligns with aperture 51 of the front end 52 of the contact tube 50. If the bore 53 is so preformed, to terminate an optical fiber, the user simply inserts the optical fiber through the bore 53 and the aperture 51 for termination, accurately positions the front end 87 of the fiber relative to the contact face 61, and then heats the tube 50 so as to liquify the thermoset and secure the fiber within the contact. When liquified, a portion of the thermoset will wick into the aperture 51.

For the embodiment where the thermoset completely fills a transverse cross-sectional area and volume of the cavity 54, the user must heat the contact tube 50 so as to soften and liquify the thermoset 55 after which the optical fiber 73 can be inserted through the hot thermoset and through the contact aperture 51. With this embodiment, since the optical fiber is inserted through the liquified thermoset 55, the insertion of the optical fiber through the thermoset 55 will cause a portion of the thermoset to be disposed within the aperture 51 and enhance the wicking effect so as to better secure the optical fiber in place, with a portion of the thermoset 55 further adhering to an end of the optical fiber. In this case it is advantageous to formulate the thermoset 55 so as to be substantially optically transparent and so as to have an index of refraction preferably close to that of a core of the optical fiber being terminated in which case the portion of the thermoset 55 on a front end of the optical fiber can function as an index matching medium when the terminated optical fiber is abutted against another similarly terminated optical fiber. Preferably, when the thermoset 55 hardens, it forms a relatively hard but resiliently deformable material which will conform to a similar relatively hard resiliently deformable material on an end of the other contact to be optically connected with the terminated optical fiber 73. This allows the contact 11 to be resiliently urged towards its mating contact and eliminates any air gap between the optically coupled fibers.

A further advantageous feature of the contact 11 is the provision of a reservoir 62 adjacent the front end 61 in a vicinity of the aperture or passageway 51 of the contact body 50, the embodiment illustrated in FIG. 2 being conical in shape. The function of the reservoir 62 becomes apparent when it is realized that any relatively hard solid resiliently deformable index matching material disposed on an end of the optical fiber 73 will tend to be displaced when urged against a similar index matching material when the terminated optical fiber is optically connected to another terminated optical fiber. The reservoir 62 provides an area for the compressed index matching material to expand into which allows an excellent continuous interface to be formed between the optical fibers being interconnected so as to eliminate any air gap and associated optical losses which an air gap may otherwise create.

A further feature of the invention, illustrated in FIG. 1, is the provision of annular flanges 66 formed on a back portion of the contact 11, and a solid adhesive 72 disposed on the exterior surface of the contact 11 and in adherence therewith. Adjacent flanges 66 form annular reservoirs for containing the adhesive 72. The adhesive 72 and the flanges 66 provide an efficient and convenient means for clamping onto braids 67 of an optical fiber cable containing the optical fiber 73 being terminated.

As illustrated in FIG. 1, by disposing the braids 67 longitudinally along the contact 11 so as to confront the adhesive 72 and the flanges 66, and by disposing a force means 68 around the braids which is capable of generating inwardly directed radial forces onto the braids 67, the braids 67 can be urged into the adhesive 72 and furthermore pinned between the force means 68 and the flanges 66. With this structure, axial pull out forces exerted on the cable are transferred to the exterior surface of the contact 11 via the braids 67, flanges 66, and adhesive 72 thus isolating the optical fiber itself from these axial pull out forces. A preferred adhesive is KYNAR TM, with polypropylene or nylon being possible as well.

According to one preferred embodiment, the force means 68 comprises a dimensionally recoverable member, preferably a heat recoverable sleeve, which has the property of shrinking and generating radially inwardly directed forces when heated. Hoop stresses generated by recovery of the sleeve 68 thus urge the braids 67 into the adhesive 72 and pin the braids 67 against the flanges 66 upon recovery of the sleeve 68. In addition, the sleeve 68 can further provide an environmental barrier around a joint between the optical fiber cable and the contact 11.

The contact 11 further includes a flange 88, which in conjunction with the ring 59, provide an area for retaining a compression spring 90. The spring 90 provides a means for urging the contact 11 in an axial direction when the contact 11 is assembled within a connector for connecting the contact 11 with a similar additional contact 11.

The invention further includes several means of terminating an optical fiber. Prior art optical fiber termination techniques generally require that the optical fiber be inserted into a contact so that a front end of the fiber extends beyond a front face of the optical fiber contact, with the optical fiber then being cleaved at a position flush with the front face of the optical fiber contact and then being polished thereat.

On the other hand, according to the methods of terminating an optical fiber according to the invention, according to a first embodiment, the optical fiber is first cleaved prior to inserting it within the optical fiber contact 11. Thereafter, the cleaved optical fiber end is inserted through the contact 11. A hard resiliently deformable index matching material 87 is then disposed on the end of the fiber, or alternatively the material 87 can comprise part of the liquid thermoset 55 in the embodiment where the thermoset is liquified using heat prior to inserting the fiber through the passageway 51. Thereafter, the end of the fiber is precisely positioned so as to be flush with a plane of the front face 61 of the contact 11.

According to an alternative preferred method of the invention, the optical fiber is not first cleaved, and is simply inserted through the contact 11 so as to extend beyond a front face 61 of the contact to a vicinity of a point such as that illustrated by the X identified by reference number 91 in FIG. 2. Thereafter, the optical fiber is cleaved at the point 91, retracted so as to be flush with the front face 61, and thereafter an index matching material is disposed on an end of the optical fiber. Such a termination procedure does not require that the optical fiber be polished as do prior art techniques. In addition, if a relatively hard resiliently deformable index matching material is disposed on the end of the optical fiber subsequent to cleaving, an efficient means of optically connecting the optical fiber 73 is provided since substantially no air gap will exist across an optical joint when the resiliently deformable index matching material is pressed against another similar type of index matching material. As explained previously, the reservoir 62 provides a means for allowing the index matching material to deform when pressed using compression forces of the spring 90 so as to insure that no air gap exists across the optical joint.

Finally, if desired, a back end of the contact 11 can contain some type of potting material, such as a potting adhesive in a vicinity of reference numberal 80, though this is not required.

According to a preferred embodiment, the thermoset 55 includes an epoxy resin, a curing agent and an accelerator, all disposed in the cavity 54 in solid form such that they substantially do not react over time until heated above a predetermined temperature. One preferred embodiment is a mixture of 100 parts novolac epoxy available from Ciba-Geigy as product ECN1299, 2–10 parts dicyandiamide available from Aldrich Chemical Co. as product dicyandiamide, a preferred amount being 8 parts, and 0.3–2 parts imidazole available from Shikokou Chemical Co. as product 2P4MHZ a preferred amount being 0.5 parts. The latter two chemicals comprise a curing agent and an accelerator, respectively.

Another thermoset example found useful but less preferred than the aforementioned mixture is 100 parts of the novolac epoxy as described above, 2–10 parts, preferably 8 parts, substituted dicyandiamide available from Ciba-Geigy as product Hardener HT2833 and 0.3–2 parts, preferably 0.5 parts, imidazole as described above. Another alternative sealant composition comprises 100 parts of novolac epoxy, 20–40 parts, preferably 30 parts, of Sumicure S available from Sumitomo Chemical Co. and 0.3–2 parts, preferably 0.5 parts imidazole as described above. It should readily be understood that other alternative thermoset compositions can be used in accordance with the invention, the above three being preferred compositions only.

EXAMPLE

A thermoset mixture comprising 100, 8, and 0.5 parts of novolac, dicyandiamide and imidazole, respectively, was used to secure an optical fiber within a stainless steel capillary tube, and after curing was heated to a temperature of 150° C. whereat a pull-out strength test was conducted by pulling on the optical fiber longitudinally relative to the stainless steel capillary tube, and during this test the optical fiber fractured prior to the adhesive. A glass transition temperature Tg of this thermoset composition was measured and found to be 170° C.-180° C. The thermoset was further used to secure two stainless steel plates together, and at 150° C. a lap sheer strength test was conducted whereat the thermoset was found to fail at approximately 950 psi. No weight loss for the cured thermoset composition was found to occur until approximately 300° C. as measured by a thermogravimetric analysis test (TGA).

Although the invention has been described with reference to particular embodiments thereof, it should be understood that various modifications thereto can be made within the spirit and scope of the invention, and accordingly the invention is to be limited only by the appended claims.

What is claimed is:

1. An optical fiber contact for terminating an optical fiber comprising:

a contact body having a cavity [and an aperture] through which an optical fiber to be terminated can extend; and a solid substantially uncured thermoset disposed within the cavity through which the optical fiber can be inserted [subsequent to softening the thermoset within the cavity], the thermoset comprising a multi-component room-temperature stable solid mixture which when heated softens, liquifies, mixes and then cures to form an adhesive capable of adhering to the optical fiber and the contact body, *the thermoset being disposed in the cavity in a hardened form prior to any part of the optical fiber being inserted into the contact body.*

2. The contact of claim 1, the adhesive consisting essentially of a solid mixture of novolac epoxy resin, either dicyandiamide or substituted dicyandiamide, and imidazole.

3. The contact of claim 1, the thermoset being cylindrically shaped so as to have a bore in a central region thereof through which the optical fiber can be inserted.

4. The contact of claim 1, the thermoset completely filing a cross-sectional area of the cavity.

[5. The contact of claim 1, an empty reservoir being formed adjacent a front end of the aperture, the front end of the aperture being on a front of the contact body whereat a front end of an optical fiber to be terminated is located.]

6. The contact of claim 1, the contact body having a front face adjacent a front end thereof whereat an end of the optical fiber being terminated can be optically connected to another optical fiber, a back end of the contact body having a plurality of flanges extending from an outer surface thereof, the flanges forming at least one annular reservoir on the surface of the contact body between the flanges, and further comprising a second solid adhesive disposed in the reservoir for adhering to fiber braids subsequent to softening the second adhesive.

7. The contact of claim 6, the flanges forming at least one reservoir extending circumferentially around the contact body along a direction essentially perpendicular to a longitudinal axis of the contact body, the optical fiber being terminated being disposed within the aperture.

8. The contact of claim 7, further comprising means for urging braids of an optical fiber cable into the second adhesive.

9. The contact of claim 8, the urging means comprising a dimensionally recoverable member which when heated recovers radially inward and attempts to conform to a shape of the outer surface of the contact body and the second adhesive.

10. The contact of claim 6, the contact body including first and second tubes and a ring, the ring being press fitted onto the second tube adjacent a flange thereof, the first tube being telescopically press fitted onto said second tube so as to form a gap between a back end of the first tube and a front end of the ring.

11. An optical fiber contact for terminating an optical fiber, comprising:

a contact body having a front face adjacent a front end thereof whereat an end of an optical fiber being terminated can be optically connected to another optical fiber, a back end of the contact body having a plurality of flanges extending from an outer surface thereof, the flanges forming at least one annular reservoir on the surface of the contact body between the flanges; and a solid adhesive disposed in the reservoir and secured to the contact body into which optical fiber braids can be embedded and secured thereto subsequent to softening the adhesive and forcing the braids into the softened adhesive;

the contact body including first and second tubes and a ring, the ring being press fitted onto the second tube adjacent a flange thereof, the first and second tubes being telescopically press fitted together such that a back end of the first tube and a front end of the ring are separated a predetermined precise distance.

12. The contact of claim 11, the contact body having an aperture therein through which the optical fiber being terminated can be inserted, the flanges forming at least one reservoir and extending circumferentially around the contact body along a direction essentially perpendicular to a longitudinal axis of the contact body, the optical fiber being disposed within the aperture.

13. The contact of claim 11, further comprising means for urging the braids of an optical fiber cable into the adhesive.

14. The contact of claim 13, the urging means comprising a dimensionally recoverable member which when heated recovers radially inward and attempts to conform to a shape of the outer surface of the contact body and the adhesive, the recoverable member when heated conducting sufficient heat to the adhesive so as to cause the braids to be embedded therewithin.

15. The contact of claim 11, further comprising a spring disposed around the contact body such that a front end of the spring contacts the ring so as to limit forward movement of the spring along an outer surface of the contact body.

16. An optical fiber contact for terminating an optical fiber, comprising:

a contact body having a cavity therein and an aperture through which an optical fiber to be terminated can extend, a reservoir being formed adjacent a front end of the aperture, the front end of the aperture being on a front of the contact body whereat a front end of the optical fiber to be terminated is located;

an optical fiber disposed within the contact body, an end of the fiber having a resiliently deformable index matching solid disposed thereon, the reservoir being empty so as to allow accommodation of at least part of said index matching solid therein upon deformation thereof by contact with an end of a mating optical fiber.

17. The contact of claim 16, the optical fiber being terminated by being disposed through the contact body and the contact body aperture, the reservoir being sized so as to allow the resiliently deformable index matching solid disposed on the end of the optical fiber to deform and substantially flatten when compressed against the end of the mating optical fiber being optically connected to the terminated optical fiber.

18. The contact of claim 17, further comprising a solid thermoset disposed within the cavity, the thermoset comprising a multicomponent mixture which when heated softens, liquifies, mixes and cures to form an adhesive capable of adhering to the optical fiber being terminated and the contact body, a portion of the cured thermoset comprising the resiliently deformable index matching solid which is disposed on the end of the optical fiber.

19. An optical fiber contact for terminating an optical fiber, comprising:

a contact body having a cavity therein and an aperture through which the optical fiber to be terminated can extend, the contact body comprising a ring and first and second tubes, the ring being disposed against a flange of the second tube, the first and second tubes being telescopically press fitted together such that a back end of the first tube is separated from a front end of the ring so as to form a gap therebetween, a length of the gap being controlled so as to precisely control a distance between a front end of the first tube and the front end of the ring, the ring being press fitted onto the second tube.

20. The contact of claim 19, further comprising a solid thermoset disposed within the cavity through which the optical fiber can be inserted, the thermoset comprising a multicomponent mixture which when heated softens, liquifies, mixes and cures to form an adhesive capable of adhering to the optical fiber and the contact body.

21. The contact of claim 19, a reservoir being formed adjacent a front end of the aperture.

22. A method of terminating an optical fiber, comprising the steps of:

cleaving an end of the optical fiber; and thereafter inserting the cleaved optical fiber end through an aperture of a contact body such that the cleaved end of the optical fiber is substantially flush with a front face of the contact body;

heating the contact body prior to inserting the cleaved optical fiber end therethrough so as to liquify a solid thermoset material therewithin such that a portion of the liquid thermoset material is disposed on and adheres to the cleaved optical fiber end.

*23. A method of terminating an optical fiber, comprising the steps of:*

*first disposing a solid thermoset within a cavity of a contact body having the cavity therein through which an optical fiber to be terminated can extend, the thermoset being disposed in the cavity in a substantially unreacted form, the thermoset comprising a multicomponent room-temperature stable solid mixture which when heated softens, liquifies, mixes and then cures to form an adhesive capable of adhering to the optical fiber and the contact body;*

*then inserting the optical fiber through the thermoset and through the contact cavity after the thermoset has been disposed within the cavity;*

*heating the thermoset so as to soften and liquify the thermoset.*

*24. The method of claim 23, the thermoset being heated after the optical fiber has been inserted through the thermoset.*

*25. The method of claim 24, the substantially unreacted thermoset having a preformed bore in a central region thereof through which the optical fiber is inserted.*

*26. The method of claim 25, further comprising the step of disposing an index matching material on an end of the fiber subsequent to inserting it through the contact body.*

*27. The method of claim 23, the thermoset being heated prior to inserting the optical fiber through the thermoset.*

*28. The method of claim 27, the substantially unreacted thermoset completely filling the cavity.*

*29. The method of claim 23, the contact body including an aperture therein through which the optical fiber to be terminated can extend, a front end of the contact aperture being on a front of the contact body, the contact cavity being adjacent a back of the aperture, and further comprising a conical-shaped reservoir adjacent the front of the contact body.*

*30. The method of claim 23, the adhesive consisting essentially of a solid mixture of novolac epoxy resin, either dicyandiamide or substituted dicyandiamide, and imidazole.*

*31. The method of claim 23, the contact body having a front face adjacent a front end thereof whereat an end of the optical fiber being terminated can be optically connected to another optical fiber, a back end of the contact body having a plurality of flanges extending from an outer surface thereof, the flanges forming at least one annular reservoir on the surface of the contact body between the flanges.*

*32. The method of claim 31, further comprising the step of disposing a second solid adhesive in the reservoir, the flanges preferably forming at least one reservoir extending circumferentially around the contact body along a direction essentially perpendicular to a longitudinal axis of the contact body.*

*33. The method of claim 32, further comprising the step of urging braids of an optical fiber cable into the second adhesive using a dimensionally recoverable member which when heated recovers radially inward and attempts to conform to a shape of the outer surface of the contact body and the second adhesive.*

*34. The method of claim 33, the contact body including first and second tubes and a ring, and further comprising the steps of press fitting the ring onto the second tube adjacent a flange thereof, and telescopically press fitting the first tube onto said second tube so as to form a gap between a back end of the first tube and a front end of the ring.*

*35. The contact of claim 1, the contact body including an aperture adjacent the cavity, an empty reservoir being formed adjacent a front end of the aperture, the front end of the aperture being on a front of the contact body whereat a front end of an optical fiber to be terminated is located.*

* * * * *